(12) United States Patent
Restivo et al.

(10) Patent No.: US 8,944,724 B2
(45) Date of Patent: Feb. 3, 2015

(54) GRAVITY DRIVEN PILE TOWER BASED DEVICE FOR PIPELINE LIFTING AND SUPPORT AND METHOD OF USE

(71) Applicant: Oceaneering International, Inc., Houston, TX (US)

(72) Inventors: Andrew Gregory Restivo, Houston, TX (US); Nikunj Patel, Houston, TX (US); Kinton Lowell Lawler, Houston, TX (US); Donald C. Nelson, Houston, TX (US); Jason Ray Pollick, Houston, TX (US)

(73) Assignee: Oceaneering International, Inc., Houston, TX (US)

( * ) Notice: Subject to any disclaimer, the term of this patent is extended or adjusted under 35 U.S.C. 154(b) by 30 days.

(21) Appl. No.: 13/632,981

(22) Filed: Oct. 1, 2012

(65) Prior Publication Data

US 2014/0093317 A1    Apr. 3, 2014

(51) Int. Cl.
*E02D 5/22* (2006.01)
(52) U.S. Cl.
CPC ...................................... *E02D 5/22* (2013.01)
USPC ..................... 405/231; 405/154.1; 405/158

(58) Field of Classification Search
CPC ........................................................ F16L 1/26
USPC ........ 405/154.1, 158, 170, 173, 184.1, 184.4, 405/231; 248/58, 59, 70, 71
See application file for complete search history.

(56) References Cited

U.S. PATENT DOCUMENTS

| | | | | |
|---|---|---|---|---|
| 3,014,346 | A * | 12/1961 | Small .............................. | 405/198 |
| 3,641,777 | A * | 2/1972 | Banjavich et al. ............. | 405/188 |
| 3,744,837 | A * | 7/1973 | Foster ............................. | 294/74 |
| 4,203,687 | A * | 5/1980 | Sumner ........................... | 405/170 |
| 5,437,517 | A * | 8/1995 | Carrioli et al. ................ | 405/169 |
| 5,531,492 | A * | 7/1996 | Raskevicius ................... | 292/335 |
| 6,290,432 | B1 * | 9/2001 | Exley et al. .................... | 405/173 |
| 6,461,082 | B1 * | 10/2002 | Smith ......................... | 405/211.1 |
| 6,887,016 | B1 * | 5/2005 | Skeels ........................... | 405/224 |
| 2011/0177358 | A1 * | 7/2011 | Horton et al. ................ | 428/640 |

* cited by examiner

*Primary Examiner* — Thomas B Will
*Assistant Examiner* — Katherine Chu
(74) *Attorney, Agent, or Firm* — Gary R. Maze

(57) ABSTRACT

A system and method for securely cradling a subsea pipeline is claimed that lands on one side of the pipeline, is embedded into the sea floor, reaches under the pipeline, positions the cradling structure, and then lifts the pipeline. The system typically comprises a gravity driven pile based device, comprising a pile tower, a roller carriage assembly, and a jacking assembly that engages the roller carriage assembly and pile tower rails.

20 Claims, 14 Drawing Sheets

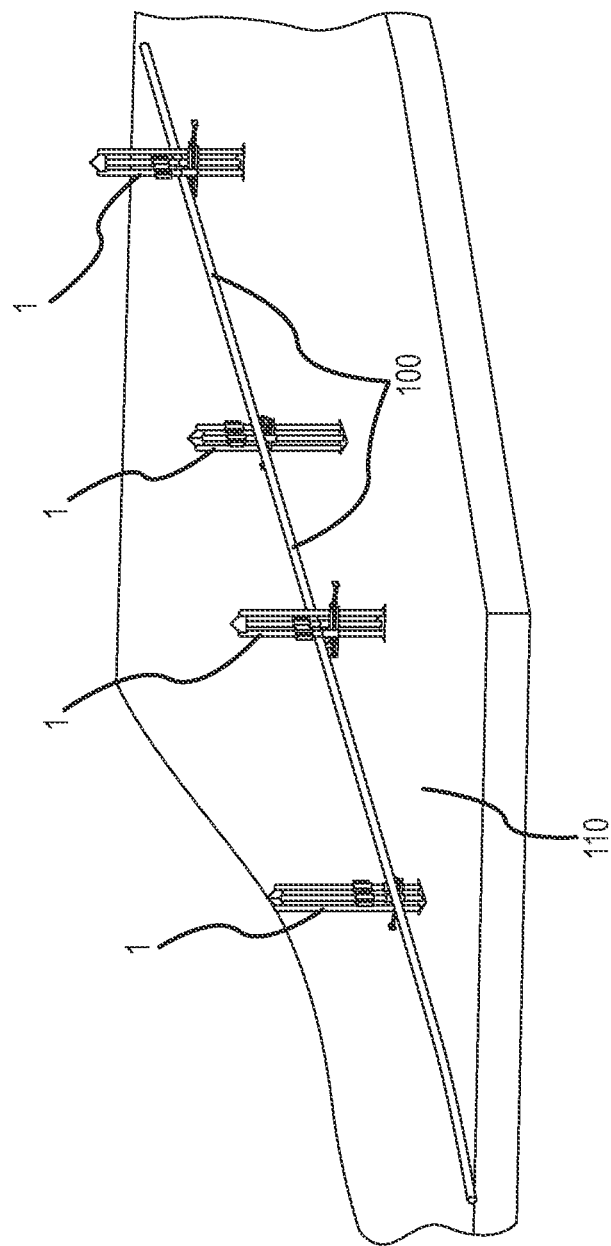

GRAVITY DRIVEN PILE TOWER BASED DEVICE FOR PIPELINE LIFTING AND SUPPORT AND METHOD OF USE

FIELD OF THE INVENTION

The disclosed inventions relate to a tool for securely cradling a subsea pipeline. More specifically, the disclosed inventions relate to a tool for securely cradling a subsea pipeline which land on one side of the pipeline and embed into the sea floor near the pipeline.

BACKGROUND

Subsea pipelines need to be elevated with respect to the sea floor proximate the pipeline on occasion for numerous reasons. It is often advantageous for such a tool to be capable of securely cradling the pipeline.

DRAWINGS

The various drawings supplied herein describe and are representative of exemplary embodiments of the invention and are described as follows:

FIG. 6 is a view in partial perspective of an installed deployment of an exemplary embodiment of the device;

DESCRIPTION OF PREFERRED EMBODIMENTS

Figure 1:
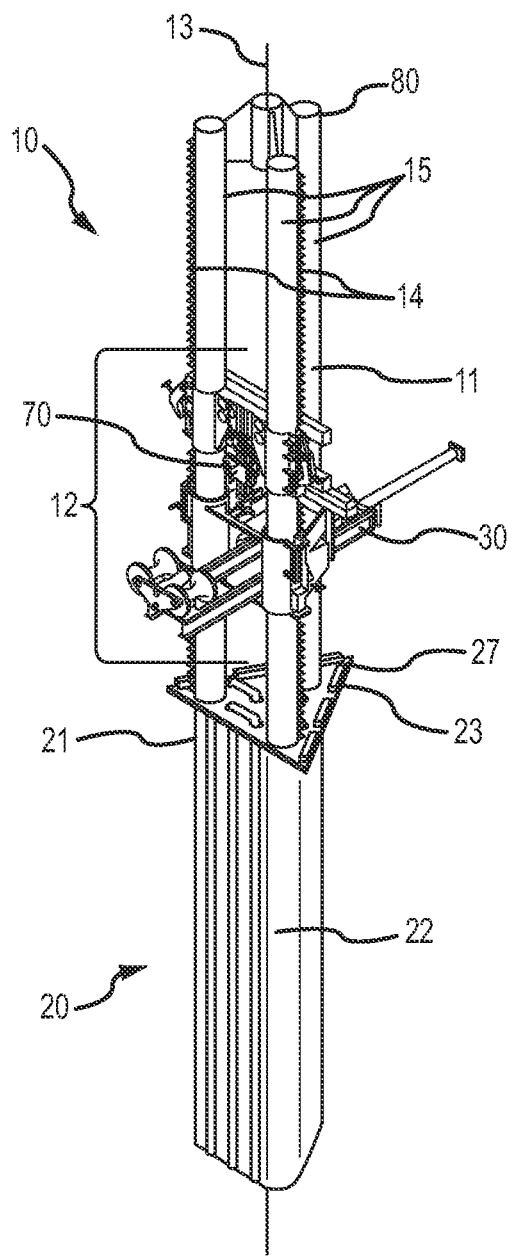
FIG. 1 is a view in partial perspective of an exemplary embodiment of the device.

Referring generally to FIGS. 1 and 6, in general, in various embodiments device 1 is a tool that lands on one side of a pipeline, e.g. pipeline 100 (FIG. 6), and embeds into the sea floor, usually using gravity. Device 1 comprises components that reach under pipeline 100 in order to position a cradling component of device 1. Device 1 provides a length of vertical adjustability for pipeline 100 and supports a load applied by the weight of pipeline 100. The cradle must provide sufficient surface area to avoid excessive stress concentration on pipeline 100. In preferred embodiments, the main structure of device 1 is fabricated out of 16" OD, 1" wall thickness riser pipe. In various embodiments, device 1 is capable of being sent overboard from a vessel in a horizontal position and deployed subsea in a vertical position.

In general, device 1 comprises three major subassemblies: pile tower 10, roller carriage assembly 30, and jacking assembly 70.

Figure 2:
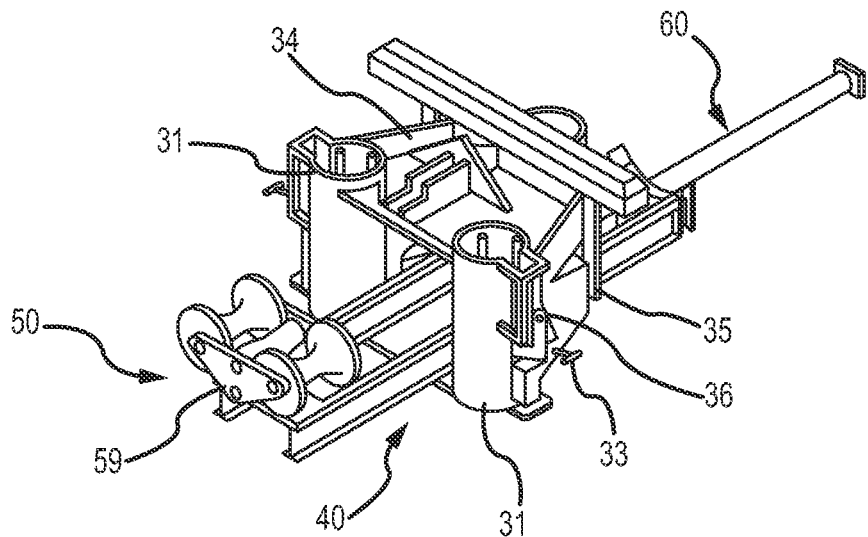
FIG. 2 is a view in partial perspective of an exemplary embodiment of the roller arm assembly.
Figure 2A:
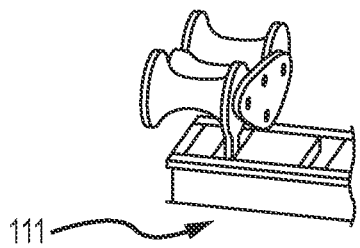
FIGS. 2A-2B are views in partial perspective of details of the exemplary embodiment of the roller arm assembly.
Figure 2B:
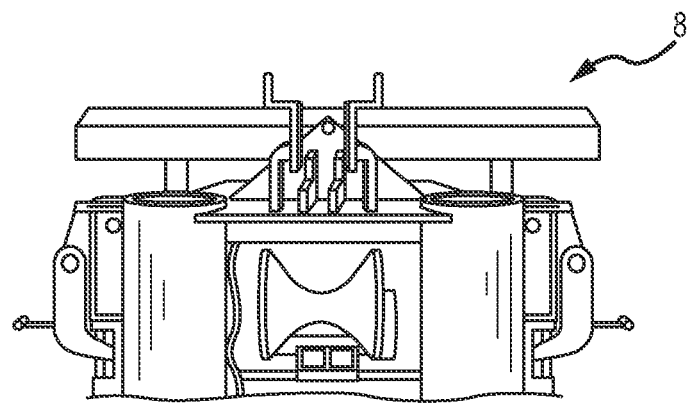
Figure 3:
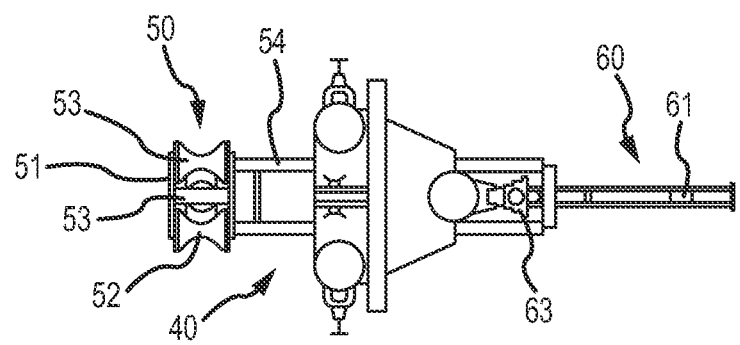
FIG. 3 is a top-down view in partial perspective of an exemplary embodiment of the roller assembly.

Pile tower 10 is the main structural component of device 1. In typical configurations it comprises three equally spaced legs 15. In an embodiment, legs 15 are 16" OD riser pipes around 57 feet in length. Preferably, legs 15 comprise API X70 steel with the ends, other than I-beams 111 (FIG. 2A) and cylinder mounting slots 112 (FIG. 5A), made of ASTM A36 steel. I-beams 111, rails 3 (FIG. 5E), and cylinder mounting slots 112 are typically made from grade 70 steel.

The top of pile tower 10 is typically tied together with three gussets which are themselves tied to a short section of middle pipe which is raised above the level of legs 15. A three inch thick pad-eye may protrude from the middle pipe and allow for a vertical deployment of pile tower 10.

Skirt 20 comprises one or more skirts 22 connected to the bottom of legs 15. Skirt 20 also provides a bearing surface for embedment into seabed 110 (FIG. 6). In a preferred embodiment, skirt 20 comprises three skirts 22, each of which measures around 1" thick by around 55" wide by around 300" tall. Skirts 22 each have one or more holes to vent seawater during embedment, typically two holes having around a 12" diameter. Scale 11 may be present to measure a level of embedment, e.g. starting at 5 feet above a mud line. In typical embodiments, skirts 22 are stitch welded to legs 15.

In some embodiments, a small mud mat 21 provides surface area for resistance during embedment. Mud mat 21 typically sits above skirt 20 and extends out past legs 15. Mud mat 21 has vent holes and, in certain embodiments, provides around at least 4250 square inches of surface area. In certain embodiments, one or more anodes are welded to the top of mud mat 21 to provide cathodic protection, e.g. ten twenty-nine pound anodes 27.

One or more rails 14, which in a preferred embodiment comprise gear tooth rails, are disposed along the outside of at least two legs 15 of pile tower 10 to provide one part of a ratcheting mechanism. Rails 14 are typically around two-inches wide and extend from mud mat 21 up to the top of pile tower 10. One of legs 15 may comprise scale 11 which may be painted on an outer surface of leg 15. Scale 11 may vary according to the desired height of pile tower 10 and usually measures an elevation above mud mat 21.

The top of pile tower 10, e.g. landing funnel 80, may be angled toward the center to provide a landing "funnel" for a weighted follower.

Figure 1A:
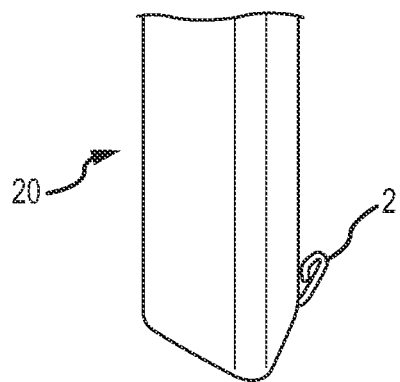
FIG. 1A is a view in partial perspective of a detail of the device.

Lifting bail 2 (FIG. 1A) may also be present, attached to the bottom of pile tower 10, to facilitate horizontal lifting and overboarding operations.

In some embodiments, pile tower 10 is coated in three coat epoxy, except for a portion of pile tower 10 below a certain foot mark on 21, which is left uncoated.

Roller carriage assembly 30 is the component that physically contacts pipeline 100 (FIG. 6). Roller carriage assembly 30 comprises three major subassemblies: carriage weldment 40, lead screw drive assembly 60, and roller arm assembly 50.

Carriage weldment 40 is a load-bearing part and typically comprises three or more plates 31, which are preferably 18" ID rolled plates, which are tied together with top plate 34 and bottom plate 35. Two rolled plates 31 comprise slots and channels 36 on their respective sides to allow rails 14 to pass through rolled plates 31. Rails 3 (FIG. 5E) mounted to bottom plate 35 secure a sliding roller frame 54 to carriage weldment 40.

Latch mount plates 4 (FIG. 5A) on top of each channel 36 act as mounting points for latches 33. A smaller hole 113 (FIG. 5b) on each of latch mount plates 4 allows for a lockout pin (not shown in the figures) to be installed which overrides the ratcheting mechanism.

Two slotted cylinder plates 112 (FIG. 5A) are mounted on top of carriage weldment 40. Cylinder 114 (FIG. 5) slides into slots 115 (FIG. 5D) in slotted cylinder plates 112.

Lead screw drive assembly 60 typically comprises a hydraulically powered unit, e.g. motor 63, that drives roller arm assembly 50 back and forth along an axis defined by roller frame 54. In preferred embodiments, lead screw drive assembly 60 is able to be removed subsea to extend its life. Motor 63 is preferably a 240 cc hydraulic motor which is coupled to lead screw 61 which can vary in length as needed, e.g. from around 1.5 inches to around 5 inches, with a typical travel of around 59 inches.

Figure 4:
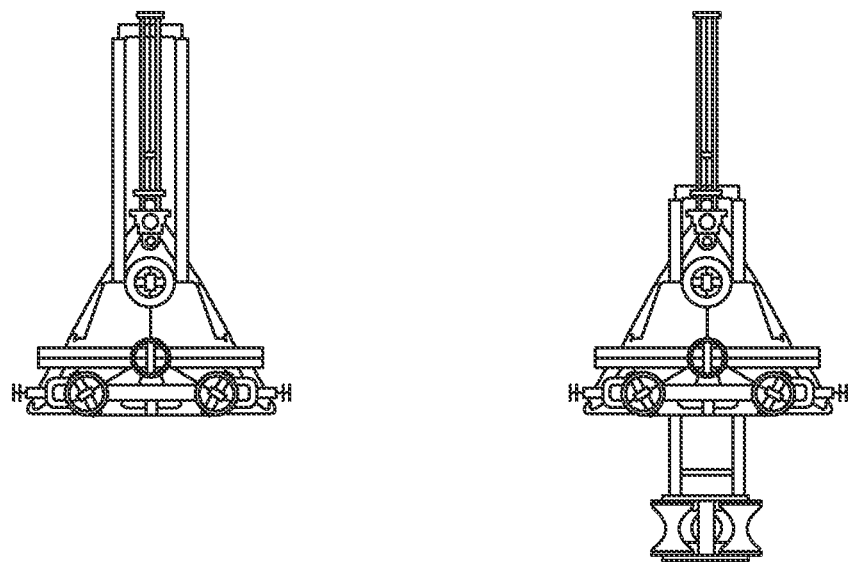
FIG. 4 is a top-down view in partial perspective of an exemplary embodiment of the roller assembly.
Figure 4A:
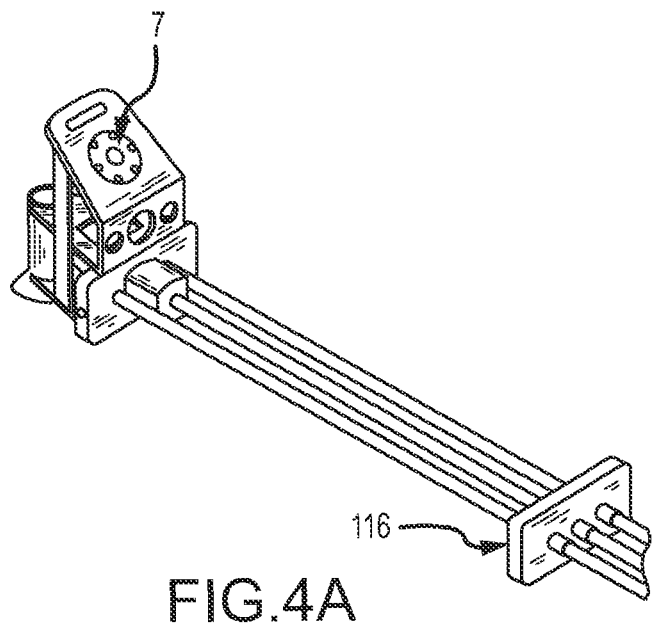
FIGS. 4A-4F are views in partial perspective of details of the exemplary embodiment of the roller assembly.
Figure 4B:
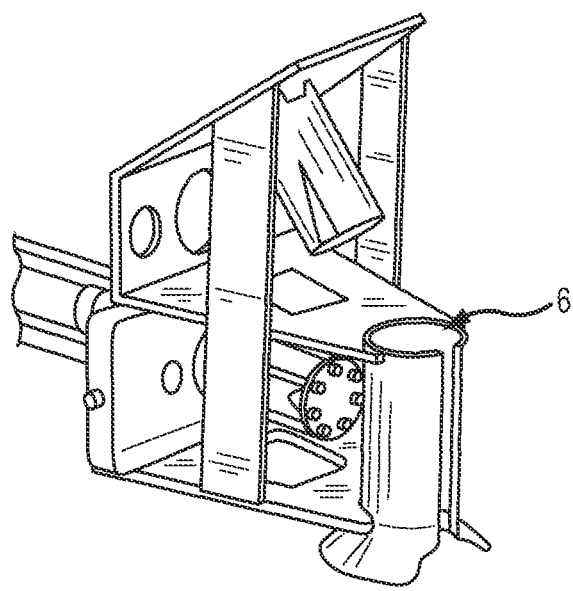

Motor mounting frame 6 (FIG. 4B) houses a docking probe receptacle, 17H dual port manifold 7 (FIG. 5G), and motor 63. The docking probe receptacle interfaces with the docking probe on the carriage. Lead screw 61 nut is flanged and is attached to a drive plate. The drive plate interfaces with slots on the roller frame in order to drive it back and forth. Two stainless rods running the length of the screw prevent the drive plate from rotating while the screw is rotating. The 17H manifold provides an ROV interface for driving roller arm assembly 50.

Roller arm assembly 50 slides in and out of carriage weldment 40 on roller frame 54. Lead screw drive assembly 60 is removable and interfaces with carriage weldment 40 and roller arm assembly 50 in order to drive roller arm assembly 50 forward and backward with respect an axis defined by carriage weldment 40. Latches on the sides of carriage weldment 40 interface with the gear rack in order to perform a one-way ratcheting function. Two ROV operable pins on top of carriage weldment 40 allow for the cylinder to be removed subsea. One 725 pound anode is welded to the top of carriage weldment 40 and provides cathodic protection for the carriage, as well as pile tower 10. UHMW strips line the inside of each of the three rolled plates of the carriage. This reduces friction and eliminates the possibility of carriage weldment 40 binding up while being lifted under load.

A set of rollers 52 is mounted to roller frame 54, which typically comprises a set of cantilevered I-beams, and roller frame 54 is typically mounted to carriage weldment 40 to support pipeline 100. A hydraulic motor and lead screw are used to drive the I-Beams back and forth. Latch pawls interface with the gear teeth on pile tower 10 to perform a one-way ratcheting action.

Figure 4C:
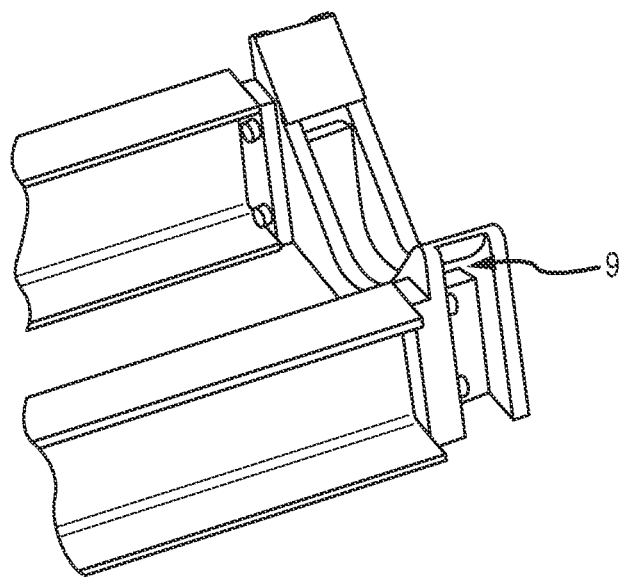

Roller box assembly 50 defines a pipeline interface and allows for free axial movement of pipeline 100 (FIG. 6) due to expansion via three rollers 52, 53. Roller arm assembly 50 comprises roller frame 54, typically a set of matching I-beams, slotted drive mount 9 (FIG. 4C), and roller box assembly 59.

In embodiments, roller frame uses a set of I-beams that ride along rails 3 (FIG. 5E) in carriage assembly 40.

Figure 4D:
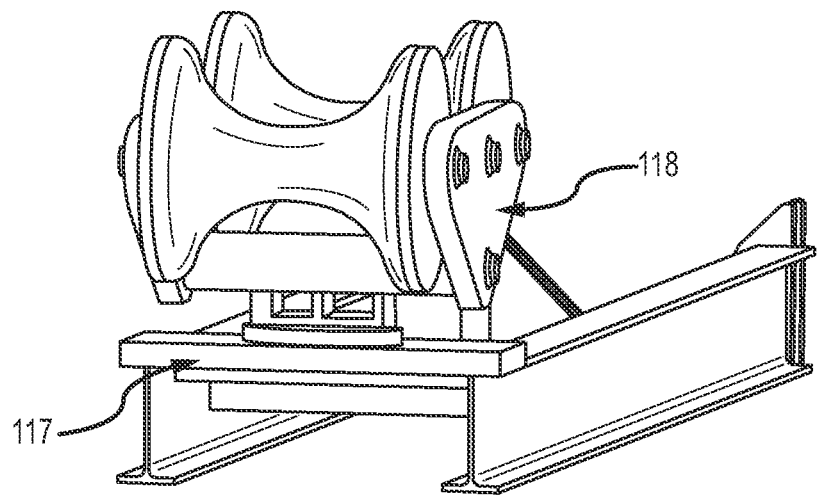

Drive mount 9 is typically bolted to the back of roller frame 54 and accepts drive plate 116 (FIG. 4A) on lead screw drive assembly 60. Machined plate 117 (FIG. 4D) rides on top of roller frame 54 and houses the bearing and hub for roller box assembly 59.

Figure 4E:
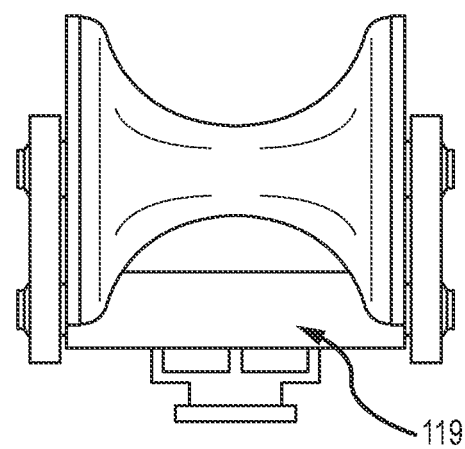
Figure 4F:
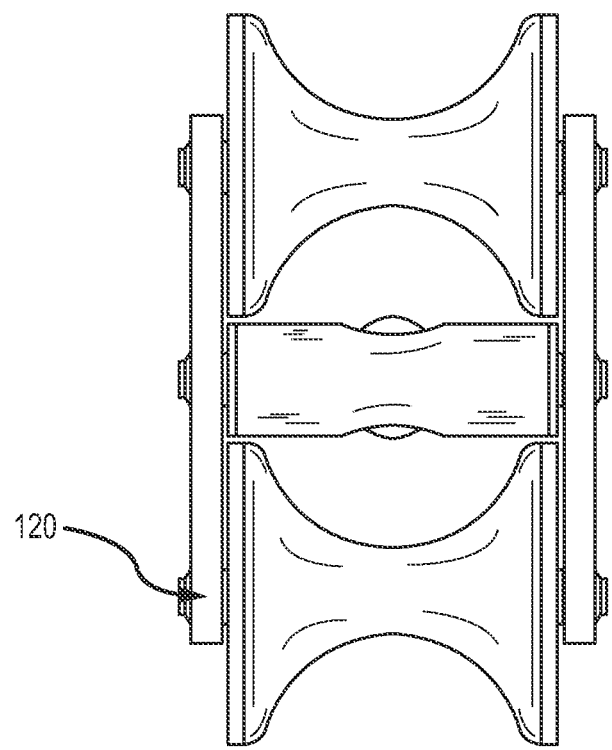

Roller box assembly 59 contains typically contains two or more rollers 52, 53, preferably three rollers 52, 53 as well as mounting plates 118 (FIG. 4D), hub 119 (FIG. 4E) (which can be a pivoting base), and bearings 120 (FIG. 4F). Two outside rollers 52 match the radius of pipeline 100 (FIG. 6) and extend up to three inches below the centerline of pipeline 100. Middle roller 53 matches the radius of pipeline 100 but does not extend up the side of pipeline 100. Rollers 52, 53 are typically disposed about stainless steel axles (not specifically shown in the figures). Rollers 52, 53 are held together with two mount plates 118 (FIG. 4D), which preferably comprise bronze bushings for bearings.

A pivoting base 119 (FIG. 4E) of roller box assembly 50 allows rollers 52 to dynamically conform (pitch) to the actual pipeline 100 position, thus ensuring an equal distribution of weight on all three rollers 52, 53 at all times.

The hub weldment supports the rollers 52 and has a bronze bearing cup around it to reduce friction. Roller box assembly can usually pivot up and down, as well as yaw side-to-side, but cannot roll side-to-side.

The roller shafts and hub typically comprise 316 stainless steel. The surfaces of rollers 52, 53 typically comprise 90 durometer polyurethane.

Jacking assembly 70 comprises jacking frame 77, latches 72, two ROV operable pins 74, and two anodes 121 (FIG. 5F) and is used to raise roller carriage assembly 30. Its "inchworm" hydraulic lifting mechanism is typically completely removable and comprises a hydraulic lifting mechanism and lateral adjustment hydraulic motor-driven screw-drive mechanism which allows for removal for ease of repairs and preservation/storage for future deployment/adjustments as required.

Jacking frame 77 comprises two rolled plates 71, which act as interfaces for rails 14, connected by I-beam 78. Rolled plates 71 slide up and down along rails 14. Channels 79 in the sides of rolled plates 71 allow clearance for rails 14 on pile tower 10. Holes 79a in each channel 79 allow for lockout pins (not shown in the figures) to be installed in order to set the location of jacking frame 77 relative to legs 15.

Mounting plates (not shown in the figures) may be used for mounting one-way latches 72. The mounting plates may also comprise a smaller secondary hole (not shown in the figures) which can be used to unlock and override the one-way ratcheting feature.

Figure 5:
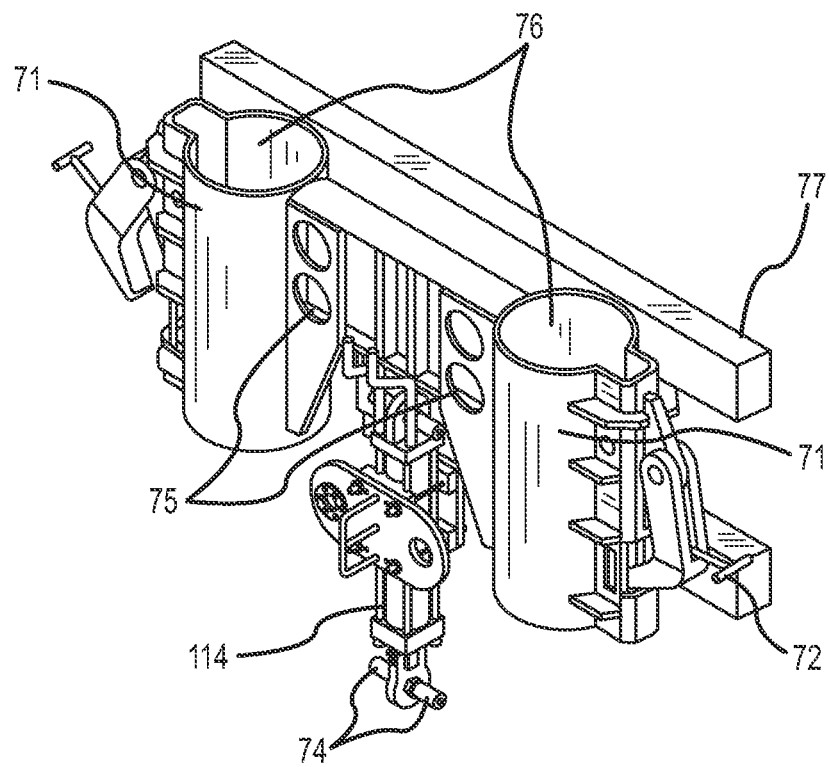
FIG. 5 is a view in partial perspective of an exemplary embodiment of the jacking assembly.
Figure 5A:
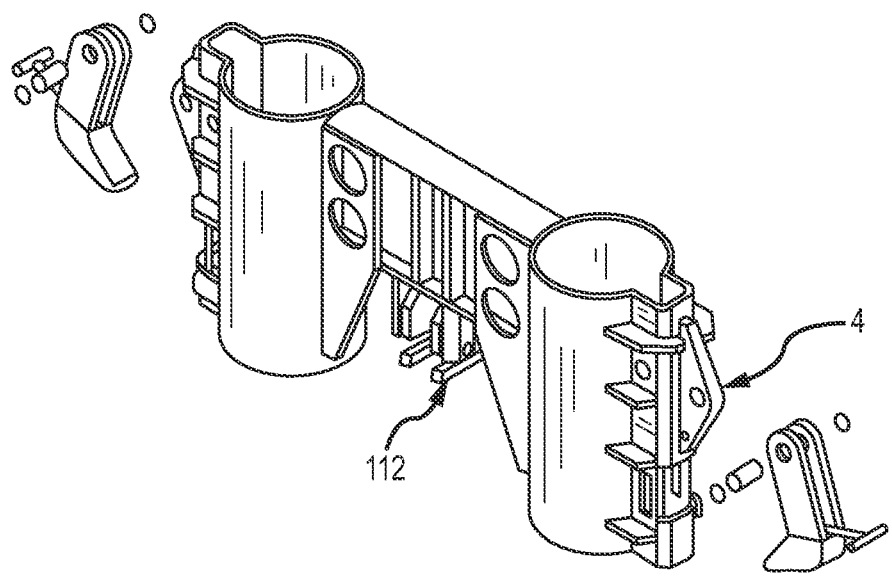
FIGS. 5A-5G are views in partial perspective of details of the exemplary embodiment of the device.
Figure 5B:
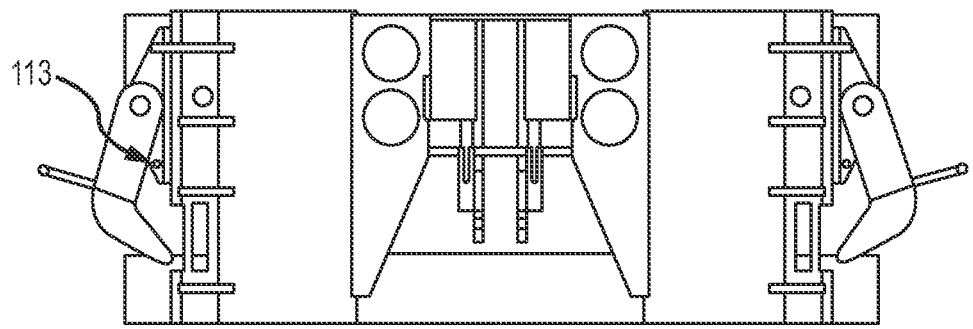
Figure 5C:
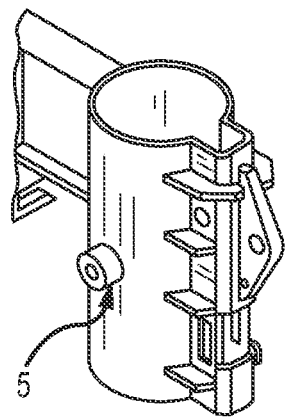
Figure 5D:
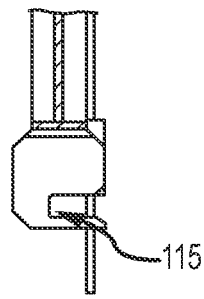
Figure 5E:
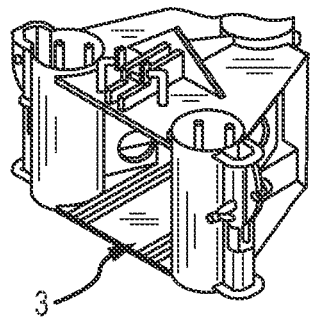
Figure 5F:
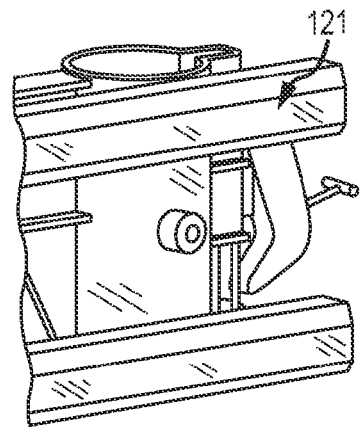

Two slotted plates 112 (FIG. 5A) on the bottom side of I-beam 79 provide a mounting location for cylinder 114 (FIG. 5).

Jacking frame 77 also comprises two threaded bosses on the front in order for a continuity pin (not shown in the figures) to be installed.

Two 725 pound anodes 121 (FIG. 5F) are attached to the back of jacking frame 77 to provide cathodic protection for jacking frame 77 and pile tower 10.

Jacking frame 77 typically uses the same one-way latch pawls 72 as does roller carriage assembly 30.

Figure 5G:
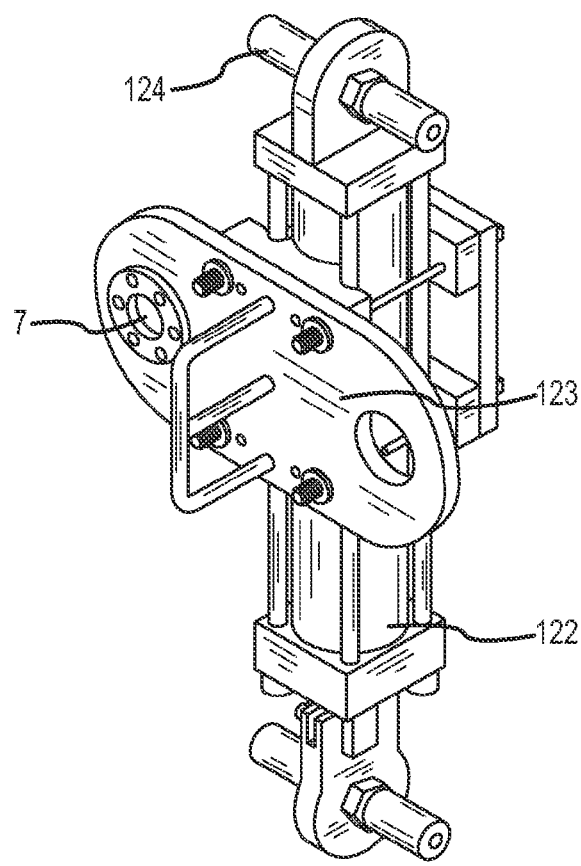
Figure 7:
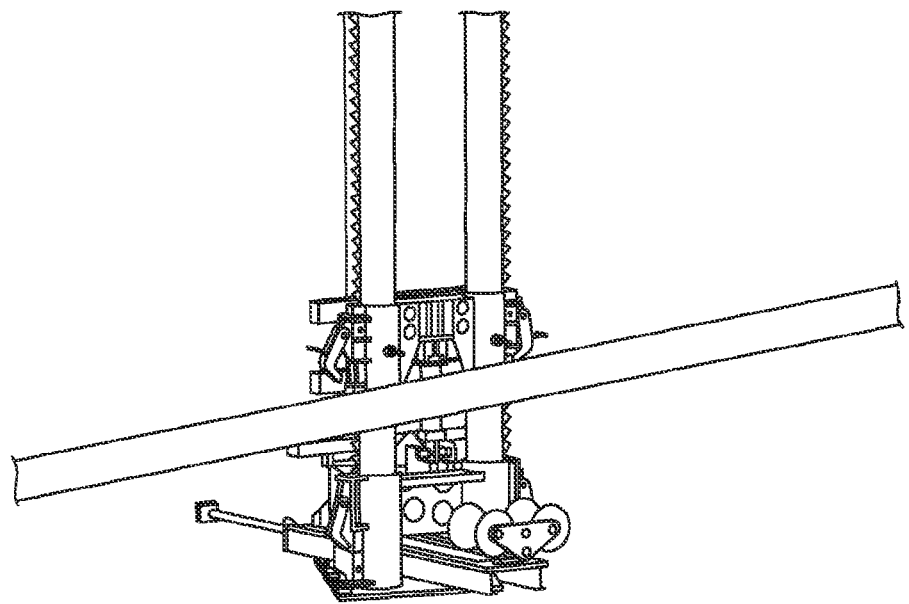
FIG. 7 is a view in partial perspective of a device embedded in the sea floor with the roller arm assembly extended underneath a pipeline in an exemplary embodiment of the device.
Figure 8:
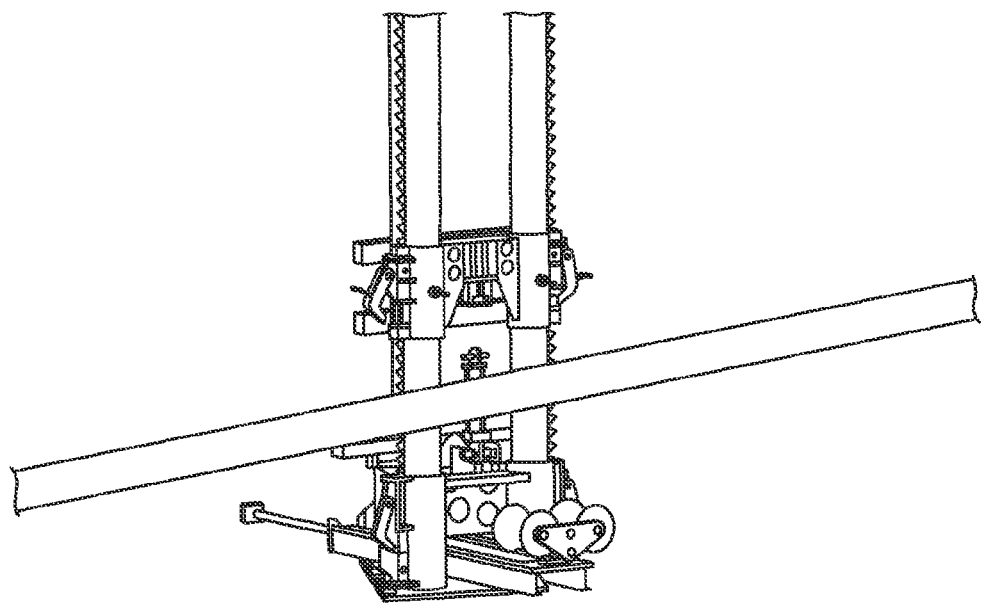
FIG. 8 is a view in partial perspective of a device embedded in the sea floor with the roller arm assembly extended underneath a pipeline and the cylinder extended in an exemplary embodiment of the device.
Figure 9:
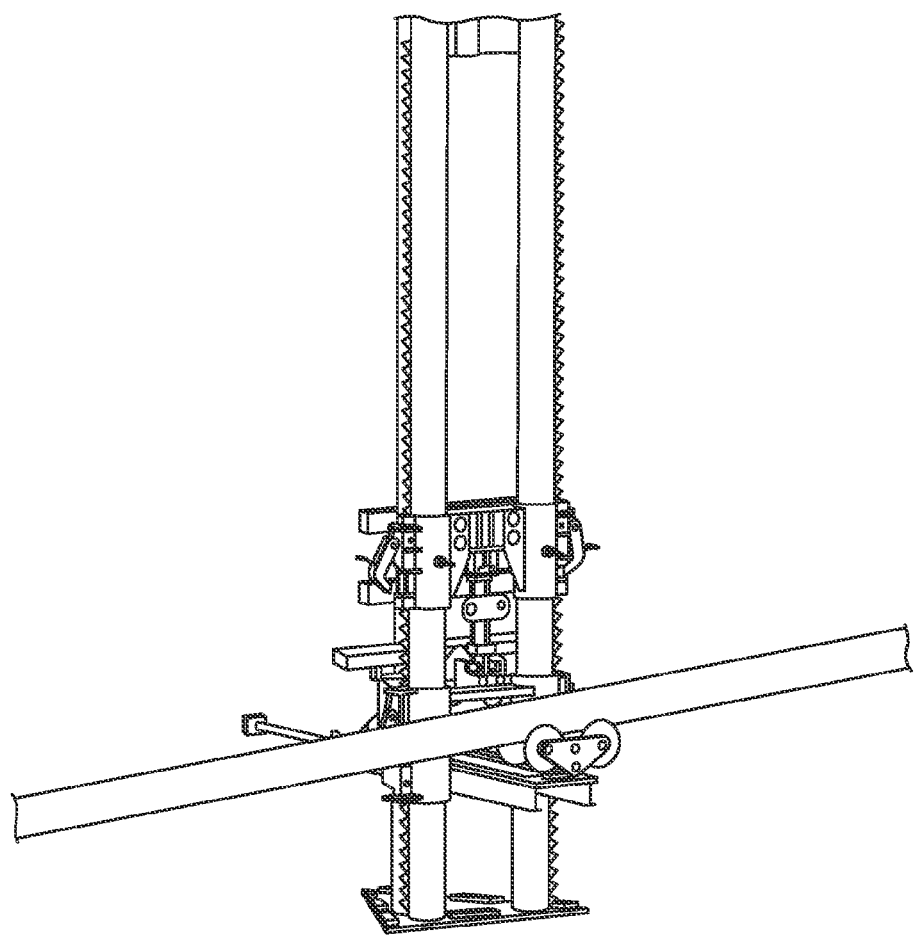
FIG. 9 is a view in partial perspective of a device embedded in the sea floor with the roller arm assembly engaged with and supporting the pipeline in an exemplary embodiment of the device.
Figure 10:
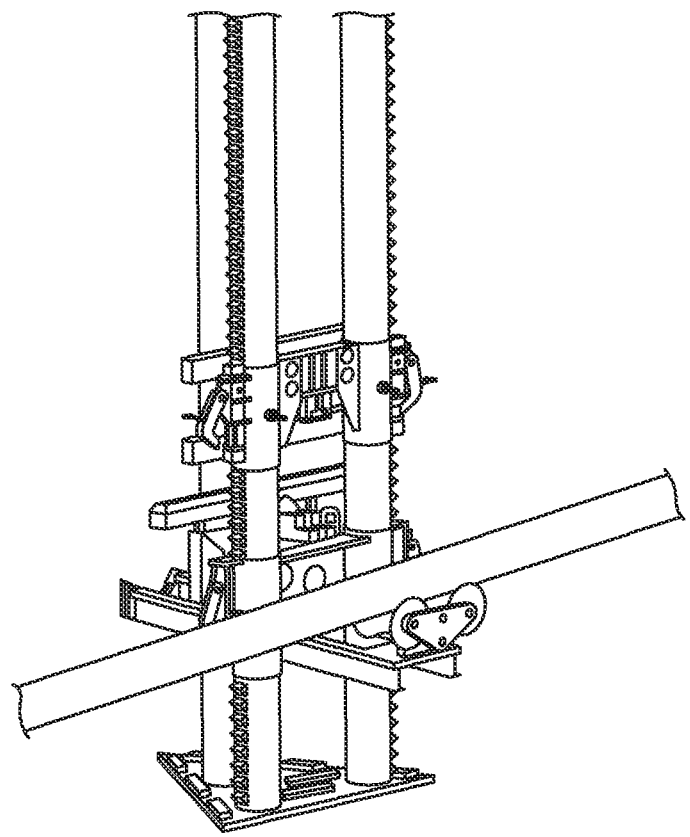
FIG. 10 is a view in partial perspective of a device embedded in the sea floor with the cylinder and lead screw assemblies removed in an exemplary embodiment of the device.

Cylinder assembly 121 (FIG. 5F) is used to alternately raise jacking frame 77 and roller carriage assembly 30. ROV operable pins allow for removal of cylinder 114 (FIG. 5). Cylinder assembly 122 (FIG. 5G) consists of cylinder 114 and hydraulic control panel 123 (FIG. 5G). Cylinder 114 typically has a bore of around 5 inches and with 2 feet of total stroke. In preferred embodiments, cylinder 114 is rated for up to 55,000 pounds of force when extending and 45,000 pounds when retracting.

Cylinder 114 (FIG. 5) is typically fitted with trunion nuts 124 (FIG. 5G) to allow it to be installed and removed from slotted plates 112 (FIG. 5A) on carriage weldment 40 and jacking frames 77. Hydraulic control panel houses a 17H dual port manifold, as well as a 5000 psi pressure gauge. The gauge can be used to roughly estimate the weight of the load being lifted. The 17H manifold allows for ROV control of the cylinder.

In preferred embodiments, rotating components comprise 45 ksi nickel aluminum bronze; pins, rotating shafts, or areas where corrosion resistance is important comprise 316 stainless steel; and rolled plates which ride up and down legs 15 comprise ultra high molecular weight polyethylene ("UHMW").

In the operation of various embodiments, referring additionally to FIGS. 6-9, after device 1 is embedded into sea floor 110, an ROV will actuate motor 63 which will turn lead screw 61, thus extending roller box assembly 59 until rollers 52,53 are directly under pipeline 100. The ROV will then swivel roller box assembly 59 until roller box assembly 59 is axially aligned with pipeline 100. The ROV will then actuate cylinder 114 (FIG. 5) in order to extend it and thereby extend cylinder 114. One-way latches 33 on carriage weldment 40 will keep carriage weldment 40 from moving down, while one-way latches 72 on jacking frame 77 allow jacking frame 77 to move upward. Once the cylinder is fully extended, the ROV will then retract the cylinder. The cylinder will retract. The one-way latches will keep jacking frame 77 from moving down, while the one-way latches on carriage weldment 40 will allow carriage weldment 40 to be pulled up by the cylinder. This process is repeated until pipeline 100 is at the desired height. The ROV will then install pins in carriage weldment 40 and jacking frame 77 to fix its position. The ROV will install continuity pins in the 5 threaded bosses on carriage weldment 40 and jacking frame 77. The ROV will then remove cylinder assembly 122 (FIG. 5G) as well as lead screw drive assembly 60.

During lifting operations, pile tower 10 will be lifted by a two-part sling via a padeye at the top of pile tower 10, and a lifting bail at the bottom of pile tower 10. A 60° sling angle will be used when lifting. This will result in roughly 35,000 pounds of force on each lifting eye. During transport, pile tower 10 will be laid on deck horizontally. Device 1 will lay with its pipeline-facing side facing down on the deck. Timbers or other blocks will be laid under pile tower 10 to raise the structure slightly off of the deck. The 60,000 pound weight of device 1 will rest on these timbers.

It will be understood that various changes in the details, materials, and arrangements of the parts which have been described and illustrated above in order to explain the nature of this invention may be made by those skilled in the art without departing from the principle and scope of the invention as recited in the appended claims.

What is claimed is:

1. A gravity driven pile based device, comprising:
   a. a pile tower, comprising:
      i. a plurality of legs arranged substantially parallel to each other to define an interior comprising an interior longitudinal central axis; and
      ii. a predetermined number of rails disposed about an outside of a plurality of the legs, the rails comprising outwardly exposed teeth;
      iii. a skirt dimensioned and adapted to be disposed between a predetermined portion of the plurality of legs and to further provide a bearing surface for embedment into soil;
   b. a roller carriage assembly (30) dimensioned and adapted to engage the rails, the roller carriage assembly further comprising:
      i. a carriage weldment;
      ii. a lead screw drive assembly, the lead screw drive assembly comprising a motor assembly dimensioned and adapted to drive the roller assembly back and forth along its rails; and
      iii. a roller arm assembly; and
   c. a jacking assembly dimensioned and adapted to engage the roller carriage assembly and the rails, the jacking assembly comprising a jacking frame.

2. The gravity driven pile based device of claim 1, wherein:
   a. the plurality of legs comprises three legs; and
   b. the predetermined number of rails comprises two rails disposed about an outside of two of the three legs.

3. The gravity driven pile based device of claim 1, further comprising latch pawls connected to the carriage weldment and the jacking frame, the latch pawls dimensioned and adapted to interface with the outwardly exposed teeth to perform a one-way ratcheting action.

4. The gravity driven pile based device of claim 1, wherein the skirt comprises a plurality of skirt panels, each skirt panel dimensioned and adapted to substantially extend along an outer portion of two of the plurality of legs.

5. The gravity driven pile based device of claim 1, further comprising a mud mat disposed proximate the skirt and dimensioned to extend a predetermined distance past an outer surface of the legs.

6. The gravity driven pile based device of claim 5, wherein the mud mat further comprises a predetermined number of anodes dimensioned and adapted to provide cathodic protection.

7. The gravity driven pile based device of claim 5, wherein the rails are disposed along an outside of the legs and extend from proximate the mud mat to proximate an end of the legs distal from the mud mat.

8. The gravity driven pile based device of claim 1, wherein the roller carriage assembly further comprises:
   a. an upper plate;
   b. a lower plate;
   c. a selectively removable cylinder;
   d. a first plurality of cylinder plates comprising a slot and a channel on the sides dimensioned and adapted to slidingly receive the cylinder;
   e. a second plurality of latch rolled plates on top of each channel dimensioned and adapted to act as mounting points for a corresponding number of latches, the latches comprising a smaller hole on each of the latch mount plates allows for a lockout pin to be installed which overrides a ratcheting mechanism; and
   f. a plurality of threaded bosses, one on the back of the rear rolled plate and one on each side of the roller frame box, dimensioned and adapted to receive a fastener therethrough to create continuity with the roller frame and legs and provide cathodic protection.

9. The gravity driven pile based device of claim 1, wherein the lead screw drive assembly further comprises a plurality of rods running the length of the screw dimensioned and adapted to prevent the drive plate from rotating while the screw is rotating.

10. The gravity driven pile based device of claim 1, wherein the lead screw drive assembly motor assembly further comprises a hydraulically powered motor dimensioned and adapted to drive the roller assembly back and forth along its rails.

11. The gravity driven pile based device of claim 10, wherein the hydraulically powered motor assembly further comprises:
  a. a motor mounting frame;
  b. a docking probe receptacle housed within the motor mounting frame, the docking probe receptacle dimensioned and adapted to interface with a docking probe connected to the carriage assembly;
  c. a dual port manifold dimensioned and adapted to provide an ROV interface for driving the roller assembly; and
  d. a hydraulic motor housed within the motor mounting frame and operatively coupled to the lead screw.

12. The gravity driven pile based device of claim 1, wherein the roller carriage assembly further comprises:
  a. a roller frame dimensioned and adapted to support a load of the pipeline, the roller frame further dimensioned and adapted to be slidingly engaged to the carriage assembly;
  b. a drive mount attached to the roller frame and dimensioned and adapted to accept a portion of the lead screw assembly; and
  c. a roller box assembly, comprising:
    i. a plurality of rollers dimensioned and adapted to conform to the pipeline;
    ii. a plurality of mounting plates;
    iii. a hub, and
    iv. a plurality of bearings.

13. The gravity driven pile based device of claim 12, wherein a predetermined number of the plurality of rollers are dimensioned and adapted to match a radius of the pipeline and extend a further predetermined distance below a centerline of the pipe.

14. The gravity driven pile based device of claim 13, wherein:
  a. the predetermined number of the plurality of rollers is two; and
  b. a third roller of the plurality of rollers is dimensioned and adapted to match a radius of the pipeline but which is further dimensioned and adapted to not extend up the side of the pipeline.

15. The gravity driven pile based device of claim 1, wherein the lead screw drive assembly is removable and interfaces with the carriage weldment and roller assembly in order to drive the frame along the predetermined direction.

16. The gravity driven pile based device of claim 1, wherein the jacking frame assembly further comprises:
  a. a jacking frame comprising a plurality of rail interfaces dimensioned and adapted to slidingly receive the rails, the rail interfaces comprising channels, the channels comprising ports dimensioned and adapted to allow for lockout pins to be installed in order to set the location of the jacking frame with respect to the pile tower;
  b. a ratcheting assembly comprising a plurality of latches attached to the rail interfaces, the latches dimensioned and adapted to selectively engage the rails;
  c. a plurality of ROV operable pins; and
  d. a plurality of anodes.

17. The gravity driven pile based device of claim 16, wherein the latches on the sides of the carriage assembly interface with the rails in order to perform a one-way ratcheting function.

18. The gravity driven pile based device of claim 16, wherein the jacking frame further comprises a cover plate disposed about a top portion of the rail interfaces, the cover plate dimensioned and adapted for mounting the ratcheting assembly, the cover plate further comprising a smaller secondary port dimensioned and adapted to unlock and override the one-way ratcheting feature.

19. The gravity driven pile based device of claim 1, further comprising an angled landing funnel dimensioned and adapted to accept a weighted follower, the angled landing funnel disposed at a top portion of the pile tower within a portion of the interior.

20. The gravity driven pile based device of claim 1, further comprising a lifting bail attached to a bottom portion of the pile tower, the lifting bail dimensioned and adapted to facilitate a horizontal lifting and overboarding operation of the gravity driven pile based device.

\* \* \* \* \*